United States Patent [19]
Garland

[11] Patent Number: 5,227,209
[45] Date of Patent: Jul. 13, 1993

[54] ARRAY OF SEPARABLE DECALS

[76] Inventor: Dean Garland, 5684 Campo Walk, Long Beach, Calif. 90803

[21] Appl. No.: 780,074

[22] Filed: Oct. 21, 1991

[51] Int. Cl.$^5$ .................................... A61F 13/02
[52] U.S. Cl. ............................ 428/40; 40/299; 40/360; 40/630; 40/632; 206/447; 283/81; 283/103; 283/105; 428/41; 428/42; 428/43; 428/131; 428/136; 428/137; 428/138; 428/914
[58] Field of Search .......... 428/40, 41, 42, 43, 428/914, 136, 137, 138, 131; 283/81, 105, 101, 103, 53, 903, 74; 40/360, 630, 632, 299; 206/447

[56] References Cited

U.S. PATENT DOCUMENTS

| | | | |
|---|---|---|---|
| 1,131,464 | 3/1915 | Besaw | 283/105 |
| 1,439,400 | 12/1922 | Broz | 283/105 |
| 3,709,763 | 1/1973 | O'Neil | 428/41 |
| 4,893,840 | 1/1990 | Berkowitz | 283/81 |

FOREIGN PATENT DOCUMENTS 2048817 12/1980 United Kingdom ............ 428/43

*Primary Examiner*—Ellis P. Robinson
*Assistant Examiner*—Nasser Ahmad
*Attorney, Agent, or Firm*—Charles H. Thomas

[57] ABSTRACT

An array of separable decals are provided to address the difficult problem of working with very tiny or narrow decals with the fingers of the human hand. The decal array is comprised of a longitudinally extending printed laminar paper strip having an upper exposed surface and an opposite surface coated with pressure sensitive adhesive. A laminar backing sheet coated with a release agent is disposed in contact throughout with the adhesive coated side of the printed strip. Transversely extending indicia, such as identification information, are printed on the exposed surface of the printed strip at longitudinal intervals therealong. The printed strip is transversely scored above each of the transversely extended indicia. Both the printed strip and the backing sheet beneath are transversely scored below each of the transversely extending indicia. The scoring is such that the printed strip separates more readily at the scoring above the transverse indicia than at the scoring below it. In this way a decal bearing a single indicia may be detached from the array by means of a handling tab which may be separated from the decal once the decal has been affixed to the desired support.

14 Claims, 3 Drawing Sheets

THE OPTICAL STORE #8980

| To Return Call: THE OPTICAL STORE | 800 336 3933 eye-D #8980 10513 |
|---|---|
| RIGHT TEMPLE | 13 LEFT TEMPLE |
| To Return Call: THE OPTICAL STORE | 800 336 3933 eye-D #8980 10512 |
| RIGHT TEMPLE | 12 LEFT TEMPLE |
| To Return Call: THE OPTICAL STORE | 800 336 3933 eye-D #8980 10511 |
| RIGHT TEMPLE | 11 LEFT TEMPLE |
| To Return Call: THE OPTICAL STORE | 800 336 3933 eye-D #8980 10510 |
| RIGHT TEMPLE | 10 LEFT TEMPLE |
| To Return Call: THE OPTICAL STORE | 800 336 3933 eye-D #8980 10509 |
| RIGHT TEMPLE | 9 LEFT TEMPLE |
| To Return Call: THE OPTICAL STORE | 800 336 3933 eye-D #8980 10508 |
| RIGHT TEMPLE | 8 LEFT TEMPLE |
| To Return Call: THE OPTICAL STORE | 800 336 3933 eye-D #8980 10507 |
| RIGHT TEMPLE | 7 LEFT TEMPLE |
| To Return Call: THE OPTICAL STORE | 800 336 3933 eye-D #8980 10506 |
| RIGHT TEMPLE | 6 LEFT TEMPLE |
| To Return Call: THE OPTICAL STORE | 800 336 3933 eye-D #8980 10505 |
| RIGHT TEMPLE | 5 LEFT TEMPLE |
| To Return Call: THE OPTICAL STORE | 800 336 3933 eye-D #8980 10504 |
| RIGHT TEMPLE | 4 LEFT TEMPLE |
| To Return Call: THE OPTICAL STORE | 800 336 3933 eye-D #8980 10503 |
| RIGHT TEMPLE | 3 LEFT TEMPLE |
| To Return Call: THE OPTICAL STORE | 800 336 3933 eye-D #8980 10502 |
| RIGHT TEMPLE | 2 LEFT TEMPLE |
| To Return Call: THE OPTICAL STORE | 800 336 3933 eye-D #8980 10501 |
| RIGHT TEMPLE | 1 LEFT TEMPLE |
| To Return Call: THE OPTICAL STORE | 800 336 3933 eye-D #8980 10500 |
| RIGHT TEMPLE | 0 LEFT TEMPLE |

ARRAY OF SEPARABLE DECALS

BACKGROUND OF THE INVENTION

1. Field of the Invention

The present invention relates to a system for mounting extremely small decals coated with pressure sensitive adhesive on a backing sheet such that the decals can be separated from each other manually and without great difficulty.

2. Description of the Prior Art

Decals having exposed surfaces with printed indicia thereon and opposite reverse sides coated with pressure sensitive adhesive have been used for many years. In order to maintain the decals such that the pressure sensitive adhesive remains fresh and strong, and in order to prevent the decals from adhering to undesired surfaces prior to use, the pressure sensitive decals are mounted on a backing sheet coated with a release agent. The backing sheet is a laminar sheet, one surface of which is coated with a slick or waxy substance to which the pressure sensitive adhesive of the decal will lightly adhere but from which the decals can be readily removed for secure application to a desired surface. The pressure sensitive adhesive does adhere lightly to the surface of the backing sheet that has been coated with a release agent. However, when a decal is desired for permanent application it can be readily peeled away from the backing sheet and affixed in a substantially permanent manner to some other surface.

In some decal mounting systems a laminar sheet of some material, such as paper, is imprinted at periodic, repetitive intervals so that the paper sheet bears an array of printed indicia. The printed paper is then coated on one side with a pressure sensitive adhesive. The printed paper is then pressed against a backing sheet that has been coated with a release agent. The printed paper sheet and the backing sheet thereupon reside in intimate, but removable contact throughout.

The sheet and backing paper are then moved past a die which cuts outlines of the desired final shape of each decal. These outlines are cut through the thickness of the printed paper sheet, but not through the backing paper, so that each indicia resides on a portion of the printed paper stock which is completely circumscribed by a die cut demarcation. The portion of the paper between the circumscribed areas thereby forms a web which can be stripped away from the backing sheet, leaving each of the circumscribed areas of the printed paper sheet mounted at separated intervals from each other on the underlying backing sheet. The decals can then be peeled back from the backing sheet, one by one, and applied to surfaces which are not coated with a release agent and to which the decals will remain firmly affixed.

In an alternative arrangement for mounting decals in preparation for use, a printed paper sheet coated with a pressure sensitive adhesive is pressed into contact with the surface of a backing sheet coated with a release aget. However, instead of die cutting only the paper sheet the juxtaposed layers of the printed sheet and backing material are scored intermittently, such as by perforations, so that beneath the area of each individual printed decal there is a congruent area of the backing sheet. The decal and the portion of the backing sheet upon which it is mounted may be removed from adjacent decals by tearing both the printed sheet and the backing sheet together along the lines of perforation.

Once the decal and the supporting portion of the backing sheet therebeneath have been separated from the remaining stock, the decal is separated from the portion of the backing sheet congruent therewith by initiation of a separation between the juxtaposed lamina at the edge of the interface therebetween. This may be done by inserting a fingernail or a thin blade between the decal and the congruent portion of the backing sheet upon which it is mounted. Once the adjacent edges are separated the decal and backing sheet portion can be grasped by the fingers of a user separately and pulled apart.

While the foregoing systems for mounting arrays of decals prior to use works quite well for decals of certain sizes, there are situations in which the configuration of the decal is such that it cannot be easily separated from the backing sheet for use according to any conventional mounting system, such as those of the type described. Significant difficulties in removing decals from backing strips for affixation to other articles arise when the decal is very small. This is because extremely tiny decals cannot be easily handled by the fingers of the human hands without inadvertently becoming affixed to an article in the wrong position. Also, in handling relatively long, narrow decals with the fingers of a human hand the decal will not infrequently become folded back upon itself, whereupon different portions of the same decal coated with pressure sensitive adhesive contact each other. When this occurs the portions of the decal which are adhered together cannot be separated without extensive damage to the decal. Once this happens the decal can only be discarded and an attempt must be made to use another decal in its place without experiencing the same mishap.

As an example, one situation in which the use of very narrow decals arises is in labeling the frames of eyeglasses. If the eyeglasses become lost or misplaced the owner can retrieve them through an identifying indicia applied to the inside surfaces of the temple pieces of the eyeglasses. According to such a system, at the time of sale the eyeglasses are provided with decals bearing an identification number and a telephone number of an entity with which the eyeglasses are registered. The name and address of the owner of the set of eyeglasses is recorded with this central information monitoring entity, along with an identifying number associated with the eyeglasses. When lost eyeglasses are turned into the information monitoring entity, the identity of the true owner can be ascertained by means of the decals which bear an identifying number which the registering agency can associate with the true owner. The registering agency then returns the eyeglasses to the true owner.

The decals thus previously applied to the temple pieces of the eyeglasses bear both the identity of the information monitoring entity and the telephone number of that entity. A person who finds the eyeglasses need merely look on the decals on the inside surfaces of the temple pieces so as to learn that these particular eyeglasses are registered with the central information monitoring entity, which serves as a clearing house. Also, the telephone number of that information storage entity can be ascertained from a decal on the opposite temple piece. The finder thereupon telephones the eyeglass registration entity. This entity then recovers the eyeglasses from the finder and, from the identification number on the decal, ascertains the identity of the true owner. The registration entity then contacts the true owner and advises that individual that the eyeglasses have been recovered. The true owner then retrieves the eyeglasses from the registration entity.

One problem with operating such a registration system is the difficulty encountered in initially applying the decals to the temple pieces of the eyeglasses. Because the temple pieces of eyeglasses are so long and narrow, the decals must likewise be extremely narrow in order to be mounted on the inside surfaces of the eyeglass temples so as to be concealed from view when the eyeglasses are worn in the normal manner by the owner. Specifically, the decals employed in such a system must be no greater than one quarter of an inch, and more typically are no greater than even about one eighth of an inch in width. In fact, one such system employs decals which are only about three thirty-seconds of an inch in width and about one and three eighths inches in length.

Very long, narrow decals are quite difficult to handle with the fingers of the human hands without some mishap, such as accidentally contacting the pressure sensitive coated portions of the decal together. When this occurs the decal can rarely be straightened out for uses without extensive damage, and is typically discarded.

SUMMARY OF THE INVENTION

The present invention involves a system for mounting decals in such a manner than even very small decals can be manipulated and applied in a desired manner using the fingers of a persons hands. The system for mounting decals for use according to the present invention avoids the difficulties of handling and manipulation which have been characteristic of prior decal mounting and storage systems.

One object of the present invention is to provide a decal mounting system in which a very narrow decal may be disconnected from an array of decals in such a manner that its pressure sensitive coated surface is exposed, without danger of the decal being folded back upon itself. This objective is achieved by constructing an array of separable decals in such a manner that each decal is provided with a temporary handling tab on which no pressure sensitive adhesive is exposed as the decal is removed from the array. The tab extends the length of the decal so that the decal is held in a flat disposition as it is moved into position for affixation to a desired surface, such as the inside surface of a temple of an eyeglass frame. The handling tab remains attached to the decal until such time as the decal has been affixed to the desired support. At that time the tab can easily be separated from the decal thus leaving only the narrow decal affixed in a more or less permanent manner to an underlying support.

Another objective of the present invention is to provide a practical means for securing printed indicia to eyeglass frames such that the frames can be permanently labelled with information sufficient to allow their recovery in the event that the eyeglasses become lost or misplaced and are found by someone who would not otherwise be able to ascertain the true owner.

Still another objective of the invention is to provide a system for removing very small decals from an array of separable decals using only the fingers of a persons hands. The removal of such a narrow decal from a greater array of decals and affixation of that decal to a desired permanent support can be accomplished without significant danger that the decal will become damaged once it is removed from the array. It can also be removed from the array without significant danger that it will be applied improperly due to the difficulty in manipulating such a sticky article having such a very small size.

In one broad aspect the present invention may be considered to be an array of separable decals. This array is comprised of a printed sheet of paper and a backing sheet which are scored in a particular manner. The printed sheet of paper has a front surface with a plurality of transversely extending, longitudinally spaced indicia thereon and a back surface coated with a pressure sensitive adhesive. The backing sheet has a release agent thereon disposed in contact throughout with the back surface of the printed sheet. Scored demarcations extend transversely across the printed sheet above the indicia, while other scored demarcations extend transversely across both the printed sheet and the backing sheet beneath the indicia. The scored demarcations are such that the sheet of paper separates more readily at the demarcations above the indicia than at the demarcations beneath the indicia.

The invention has the greatest advantages over prior arrays of separable decals when the longitudinal distance from a demarcation above an indicia to a demarcation beneath the same indicia is no greater than about one eighth of an inch, or even no greater than about one quarter of an inch.

The scored demarcations above the indicia are preferably formed as continuous die cuts through the printed sheet extending transversely thereacross. These die cuts do not extend into or through the backing sheet, however. The scored demarcations beneath the indicia, on the other hand, are preferably formed as intermittent perforations that extend transversely across and through the structure of both the printed sheet and the backing sheet.

In one embodiment the printed strip may be scored entirely through its structure and entirely across its width above each of the indicia. While there is then in fact no structure directly connecting the portion of the printed strip bearing the indicia directly to the portion of the printed strip immediately above the indicia, the decal bearing the indicia is held in place in the array by the structure of the backing strip.

When removal and application of a decal is desired, the user exerts tension longitudinally on both the printed strip and the backing strip both above and beneath the decal to be removed and applied. This tension results in a separation of the backing sheet along the intermittent or partial scoring thereof immediately beneath the indicia to be removed and applied. However, the portion of the printed sheet bearing the indicia does not separate from the portion of the printed sheet immediately beneath the indicia since, because of the demarcation in the printed sheet immediately above the indicia, all of the force of separation at this time acts upon the backing sheet. There is therefore no separation of the printed sheet immediately beneath the indicia.

The portion of the printed sheet immediately beneath the indicia, together with the portion of the backing sheet to which it is removably attached, serve as a handling tab by means of which the decal can be held in a flat and linear disposition and maneuvered into position for permanent affixation to a desired support.

The decal is brought to the support to which it is to be affixed by means of the handling tab and it is held in position by the handling tab while the exposed pressure sensitive adhesive on the undersurface of the decal is pressed into place against the support to which the decal is to be affixed. With the fingers of one hand holding the decal pressed against its support, the handling tab formed by the adjacent portion of the printed sheet and the backing surface adjacent thereto is then pulled away from the decal and separated therefrom along the scoring beneath the indicia. The decal remains in position firmly affixed to its underlying support and the handling tab is then discarded.

The invention may be described with greater clarity and particularity with reference to the accompanying drawings.

DESCRIPTION OF THE DRAWINGS

FIG. 2 is a top plan view of a single page of side by side arrays of separable decals in the booklet of FIG. 1.

DESCRIPTION OF THE EMBODIMENT

Figure 1:
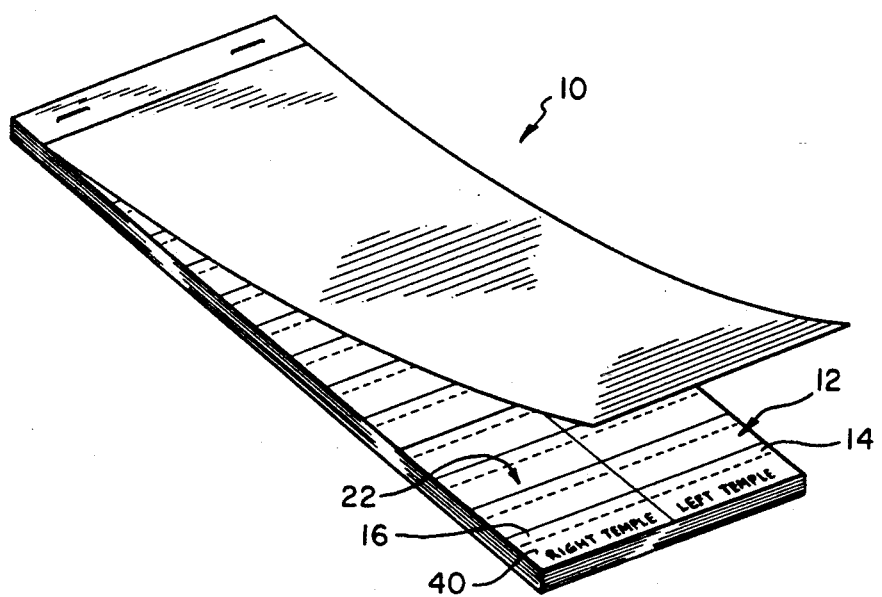
FIG. 1 is a perspective view of a booklet of pages of arrays of very narrow decals.
Figure 8:
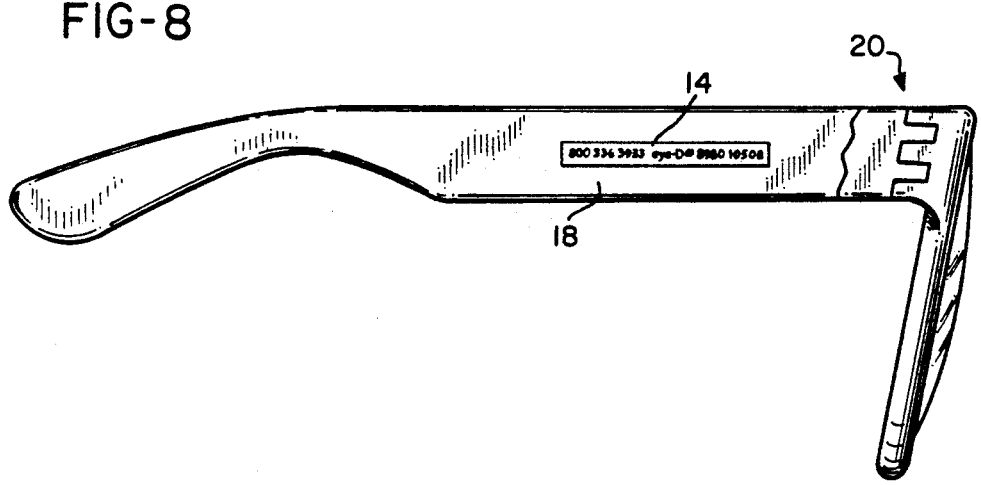
FIG. 8 illustrates the eyeglass temple of FIG. 7 once the decal thereof has been applied and the handling tab removed.

FIG. 1 illustrates a booklet 10 comprising a plurality of pages 12 of arrays of separable decals 14 and 16. The decals 14 and 16 are designed respectively for affixation to the left and right temples 18 of a pair of eyeglasses 20, depicted in FIG. 8. The page 12 is comprised of a longitudinally extending printed rectangular strip 22 having an upper surface 24 bearing a plurality of transversely extended indicia in the form of the decals 14 and 16. The decals 14 and 16 are divided from each other by a longitudinal die cut demarcation 26, so that the decals 14 may be considered to be arranged in one linear array of decals separable from a comparable linear array of the decals 16 located adjacent thereto on the page 12. Both the decals 14 and the decals 16 are arranged repetitively within their respective longitudinal arrays at longitudinally spaced intervals along the paper strip 22.

Figure 3:
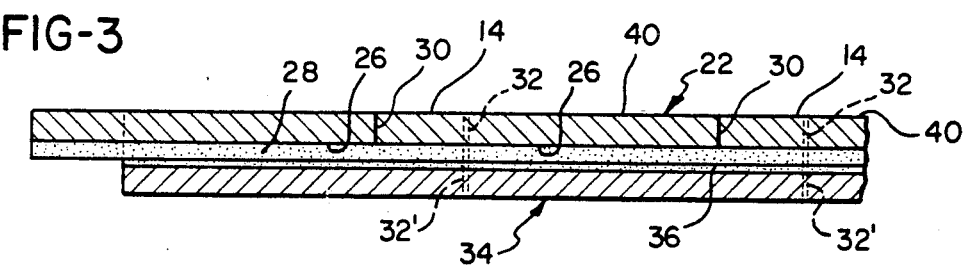
FIG. 3 is a sectional elevational view taken along the lines 3—3 of FIG. 2.

As illustrated in FIG. 3, the undersurface 26 of the paper strip 22 is coated with a pressure sensitive adhesive layer 28. The printed strip 22 is scored thereacross with linear, die cut scoring demarcations indicated at 30 above each of the transversely extending indicia 14 and 16. The paper strip 22 is partially scored by scoring demarcations 32, which are intermittent perforations at locations transversely beneath each of the transversely extending decals 14 and 16. The printed strip 22 thereby resists separation at the demarcations 32 beneath the decals 14 and to a greater extent than above the decals 14 and 16 at the demarcations 30 upon the application of longitudinal tension on the strip 22.

The page 12 is also comprised of a longitudinally extending backing sheet 34 that is coextensive with the printed strip 22. The backing sheet 34 is formed of a strip of treated paper that has an upper surface with a release agent coating 36 thereon. The backing sheet 34 is positioned against the undersurface 28 of the printed strip 22. As illustrated in FIG. 3, the backing sheet 34 is at least partially scored transversely in alignment with each location 32 of partial scoring of the printed strip 22. That is, the backing sheet 34 has scoring demarcations 32' formed by the same die cut perforations that form the demarcations 32 on the printed sheet 22.

Figure 5:
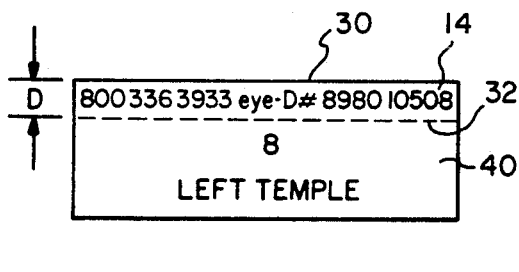
FIG. 5 is a top plan view of a single decal and handling tab removed as illustrated in FIG. 4.

FIG. 5 illustrates a single one of the decals 14 separated from the page 12, but still including a handling tab 40. The decal 14 has imprinted thereon an indicia in the form an "800" telephone number and an identification number associated with the particular eyeglasses 20. The decal 14 is quite narrow, and the width which is the longitudinal distance indicated at D in FIG. 5 across the indicia between the scoring 30 above the indicia and the scoring 32 beneath the same indicia is about one eighth of an inch. The decal 14 is lengthy relative to its narrow width, once separated from the handling tab 40, and may typically be about one and one half inches in length. The handling tab 40 is large enough to be manipulated by the fingers of the hands of a user, and typically is rectangular in configuration and is about one half inch by one and one half inches in size.

The printed strip 22 is scored entirely through its structure longitudinally by the scoring demarcation 26 between the arrays of decals 14 and 16 and by the transverse scoring lines 30 across the printed strip 22 above each of the transversely extending indicia on the decals 14 and 16. The scoring lines 30 are each formed as a single linear die cut extending entirely across the transverse width of each of the printed strips 22 entirely through the thickness of each printed strip 22. On the other hand, the transverse scoring demarcations 32 below the indicia on the decals 14 and 16 are each formed as an intermittent die cut perforation into the printed strip 22 and into the backing sheet 34. The intermittent die cuts forming the demarcations 32 in the printed sheet 22 and the demarcations 32' in the backing sheet 34 are formed entirely through the thickness of both the printed strips 22 and the backing sheet 34. Each printed strip 22 is thereby scored entirely through its structure and entirely across its width above the indicia on the decals 14 and 16. Each printed strip 22 and the backing sheet 34 therebelow are scored entirely through their structures intermittently by die cut perforations thereacross.

Figure 4:
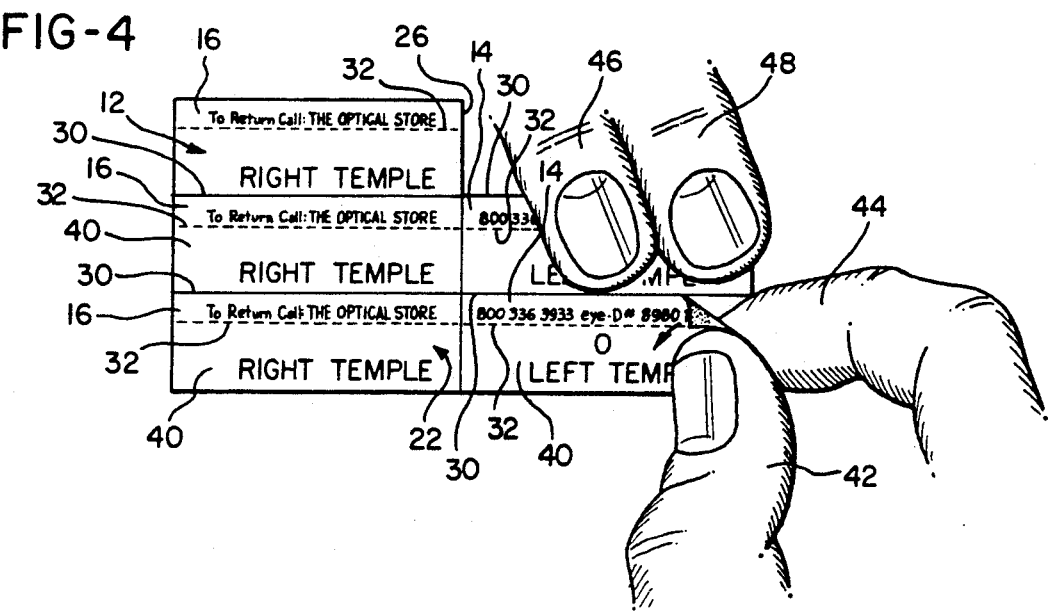
FIG. 4 is a top plan view illustrating removal of a single decal and handling tab from the page of FIG. 2.

The manner of detaching the decals 14 and 16 from their respective arrays on the page 12 is best illustrated in FIG. 4. As shown in that drawing figure the handling tab 40 of the end-most remaining decal 14 is grasped between the thumb 42 and forefinger 44 of one hand while the user places two fingers 46 and 48 of the opposite hand on the handling tab 40 of the next adjacent decal 14. With a twisting motion of the thumb 42 and forefinger 44 the user pulls back the handling tab 40 of the decal 14 to be detached from the remaining structure of the page 12. This pulling and twisting action causes the adhesive layer 28 on the reverse side of the decal 14 to separate from the release agent 36 on the backing sheet 34 therebeneath, at the same time as the backing sheet layer of the handling tab 40 that is grasped by the thumb 42 and forefinger 44 separates from the next adjacent portion of the backing sheet 34 along the perforated demarcation 32'. Because the die cut demarcation at 30 is a continuous cut across the entire width of the paper 12 and because the intermittent die cut perforations forming the demarcations 32 and are discontinuous cuts across the width of the strip 12, the selected decal will not separate from the adjacent structure of the paper layer 22 along the demarcation 32 created by the intermittent perforation. To the contrary, the separation of the layer of paper 22 will occur along the continuous demarcation 30 because there is still some structural strength left in the paper strip 22 at the intermittent demarcation 32, as contrasted with the complete separation across the paper at the demarcation 30.

Figure 6:
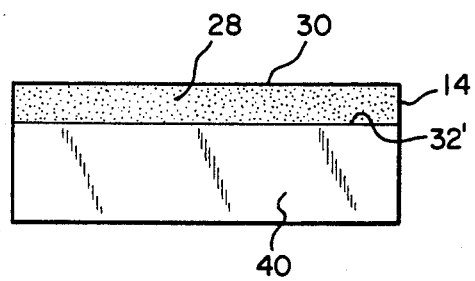
FIG. 6 is a bottom plan view of the decal and handling tab of FIG. 5.

Once the decal 14 has been pulled free of the page 12 by means of the handling tab 40 in the manner illustrated in FIG. 4, it will appear from the top as illustrated in FIG. 5. As shown in FIG. 5 the decal 14 and its handling tab 40 have been completely detached from the remaining structure of the page 12 along the demarcations 30 and 26. FIG. 6 illustrates the reverse side of the detached structure of FIG. 5. As shown in that drawing figure the underlying backing sheet 34 is detached from the remaining structure of the backing sheet of the page 12 along the demarcation 32', which is parallel to but longitudinally offset from the demarcation 30 at which the paper 22 separated. This longitudinal offset is exactly equal to the width D of the decal 14. The pressure sensitive adhesive 28 on the underside of the selected decal 14 is thereupon fully exposed. However, because the handling tab 40 still remains attached to the decal 14, the decal 14 will remain in a flat transversely extended condition during manipulation.

Figure 7:
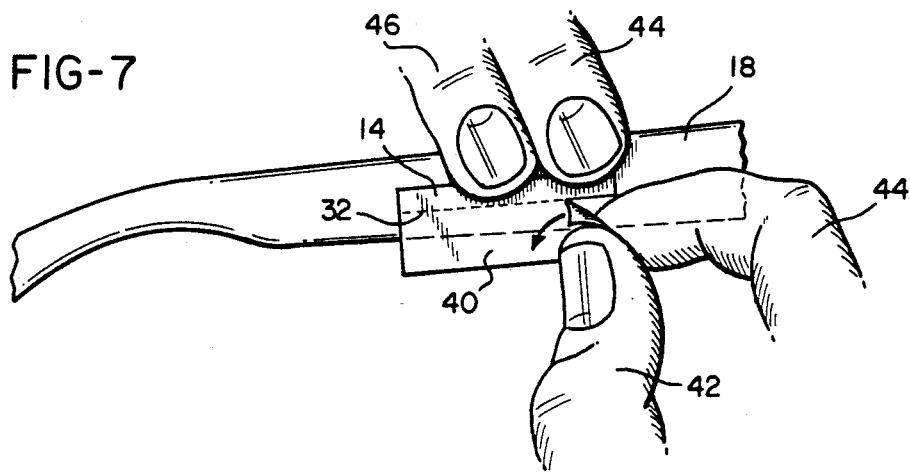
FIG. 7 illustrates the manner of affixation of the decal of FIG. 5 to an eyeglass temple.

FIG. 7 illustrates the further manipulation of the decal 14. The decal 14 is maneuvered into an appropriate position of alignment with the eyeglass temple 18 by means of the handling tab 40. When the user is satisfied that the decal 14 is properly aligned lengthwise along the inside surface of the eyeglass temple 18, the underside of the decal 14 bearing the pressure sensitive adhesive 28 is pressed against the inside surface of the eyeglass temple 18 using the fingers 46 and 48 of one hand. As shown, the user then again imparts a twisting action to the handling tab 40, using the thumb 42 and the forefinger 44 of the other hand, while holding the decal 14 in position against the eyeglass temple 18 with the fingers 46 and 48 of the opposite hand. In this manner the decal 14 separates from the portion of the printed paper strip 22 forming the top side of the handling tab 40 and the handling tab 40 is pulled completely free from the decal 14, with the separation therefrom occurring along the demarcation 32. The decal 14 is thereupon left by itself firmly affixed to the inside surface of the lens temple 18 by virtue of the pressure sensitive adhesive 28.

A decal 16 may likewise be firmly affixed to the inside surface of the opposite lens temple 18 in an identical manner. Thus, the eyeglasses 20 can be labeled with an inconspicuous identification system so that if lost they can be returned to their true owner.

It is to be understood that the array of separable decals according to the invention has numerous other uses beyond the eyeglass identification system which has been described for illustrative purposes only. The system is particularly useful when any small or narrow decal is to be separated from an array of decals and affixed to some support. Undoubtedly, numerous variations and modifications of the invention will become readily apparent to those familiar with the mounting of decals in preparation for use. Accordingly, the scope of the invention should not be construed as limited to this specific embodiment depicted and described, but rather is defined in the claims appended hereto.

I claim:

1. An array of separable decals comprising a longitudinally extending printed sheet of paper having a front surface with a plurality of transversely extending, longitudinally spaced indicia thereon and a back surface coated with a pressure sensitive adhesive, a backing sheet having a release agent thereon disposed in contact throughout with said back surface of said printed sheet, a scored demarcation extending transversely on said printed sheet immediately above each said indicia, another scored demarcation extending transversely on both said printed sheet and said backing sheet immediately beneath each said indicia, wherein said demarcations beneath each said indicia and above the next longitudinally adjacent indicia are spaced longitudinally apart from each other a sufficient distance to define a temporary handling tab therebetween capable of being gripped between the thumb and forefinger of a human hand, and wherein both of the aforesaid scored demarcations for each said indicia are such that said sheet of paper separates more readily at said demarcation above each said indicia than at said demarcation beneath each said indicia.

2. An array of separable decals according to claim 1 wherein the longitudinal distance from a demarcation as aforesaid above each indicia to a demarcation as aforesaid beneath the same indicia is no greater than about one quarter of one inch.

3. An array of separable decals according to claim 2 wherein the longitudinal distance from a demarcation as aforesaid above each indicia to a demarcation as aforesaid beneath the same indicia is no greater than about one eighth of one inch.

4. An array of separable indicia according to claim 1 wherein each said scored demarcation above each said indicia is formed as a continuous transverse die cut through said printed sheet and each said scored demarcation beneath each said indicia is formed as a transverse line of intermittent perforations through said printed sheet and said backing sheet.

5. An array of separable decals comprising a longitudinally extending printed laminar strip having an upper, exposed surface, and an opposite surface coated with pressure sensitive adhesive, a laminar backing sheet having an upper surface coated with a release agent and disposed in contact throughout with said surface of said printed strip that is coated with adhesive, a plurality of transversely extending indicia printed on said exposed surface of said printed strip at repetitive longitudinal intervals therealong, transverse scoring across only said printed strip above each of said transversely extending indicia, and other transverse scoring across both said printed strip and said backing sheet below each of said transversely extending indicia, wherein said scoring is such that said printed strip separates more readily at said scoring above said transverse indicia than at said other transverse scoring below said transverse indicia, and the longitudinal distance between said longitudinal intervals is sufficient to define a temporary handling tab for each indicia extending between said other transverse scoring below each indicia and said transverse scoring above the next adjacent indicia, said handling tab being of a size large enough to be gripped between the thumb and forefinger of a human hand.

6. An array of decals according to claim 5 wherein the distance across said indicia between each scoring above such indicia and each other scoring beneath the same indicia is no greater than about one quarter of one inch.

7. An array of decals according to claim 6 wherein the distance across said indicia between each scoring above each indicia and each other scoring beneath the same indicia is no greater than about one eighth of one inch.

8. An array of separable decals according to claim 5 wherein each transverse scoring above each said indicia is formed as a single linear die cut extending entirely across the transverse width of said printed strip and each other transverse scoring below each said indicia is formed as an intermittent die cut into said printed strip and into said backing sheet.

9. An array of separable decals according to claim 8 wherein said die cuts of said transverse scoring above each of said indicia extend entirely through the thickness of said printed strip.

10. An array of separable decals according to claim 8 wherein said die cuts of said other transverse scoring below each said indicia are intermittent and extend entirely through the thickness of both said printed strip and said backing sheet.

11. An array of separable decals comprising: a longitudinally extending printed laminar strip having an upper surface bearing a plurality of transversely extending indicia arranged repetitively at longitudinal spaced intervals therealong and an undersurface coated with a pressure sensitive adhesive, wherein said printed strip is scored transversely thereacross at locations immediately above each of said transversely extending indicia, and is also transversely scored less completely at locations thereacross immediately beneath each of said transversely extending indicia than at said locations immediately above each of said indicia, whereby said printed strip resists separation beneath said indicia to a greater extent than above said indicia upon the application of longitudinal force thereon, and a longitudinally extending backing strip coextensive with said printed strip and having an upper surface with a release agent coating thereon disposed in contact with said undersurface of said printed strip and wherein said backing strip is scored transversely in longitudinal alignment with each location of scoring of said printed strip beneath each of said indicia, and the distance between said longitudinally spaced intervals is great enough so that said printed strip and said backing strip together define a temporary handling tab for each indicia between said location beneath each indicia where said printed strip and said backing strip are transversely scored and said location above the next longitudinally adjacent indicia where said printed strip is transversely scored, and said handling tab is large enough to be gripped between the thumb and forefinger of a human hand.

12. An array of separable decals according to claim 11 wherein said printed strip is scored entirely through its structure and entirely across its width above said indicia and said printed strip and said backing strip are scored entirely through their structures intermittently across their widths beneath said indicia.

13. An array of separable decals according to claim 11 wherein said printed strip and said backing strip are intermittently scored as aforesaid beneath said indicia by die cut perforations.

14. An array of separable decals according to claim 11 wherein the distance between adjacent locations at which said printed strip is scored above an indicia and at which it is scored beneath the same indicia is no greater than about one eighth of an inch.

* * * * *